US012595326B2

(12) United States Patent
Choi et al.

(10) Patent No.: US 12,595,326 B2
(45) Date of Patent: Apr. 7, 2026

(54) THERMOPLASTIC RESIN COMPOSITION

(71) Applicant: LG CHEM, LTD., Seoul (KR)

(72) Inventors: Jeong Su Choi, Daejeon (KR); Won Seok Lee, Daejeon (KR); Roo Da Lee, Daejeon (KR); Sang Hoo Park, Daejeon (KR); Jong Ju Lee, Daejeon (KR); Seung Je Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 829 days.

(21) Appl. No.: 17/762,468

(22) PCT Filed: Mar. 31, 2021

(86) PCT No.: PCT/KR2021/003986
§ 371 (c)(1),
(2) Date: Mar. 22, 2022

(87) PCT Pub. No.: WO2021/235676
PCT Pub. Date: Nov. 25, 2021

(65) Prior Publication Data
US 2022/0340701 A1 Oct. 27, 2022

(30) Foreign Application Priority Data

May 21, 2020 (KR) ........................ 10-2020-0060730
Mar. 30, 2021 (KR) ........................ 10-2021-0041215

(51) Int. Cl.
| | |
|---|---|
| C08F 220/44 | (2006.01) |
| C08F 212/08 | (2006.01) |
| C08F 220/06 | (2006.01) |
| C08F 257/02 | (2006.01) |
| C08F 265/06 | (2006.01) |

(52) U.S. Cl.
CPC .......... C08F 220/44 (2013.01); C08F 212/08 (2013.01); C08F 220/06 (2013.01); C08F 257/02 (2013.01); C08F 265/06 (2013.01)

(58) Field of Classification Search
CPC .... C08F 220/44; C08F 220/06; C08F 265/06; C08F 212/08; C08F 257/02
See application file for complete search history.

(56) References Cited

U.S. PATENT DOCUMENTS

| | | | |
|---|---|---|---|
| 10,730,981 B2 | 8/2020 | Shibata et al. | |
| 2003/0040555 A1 | 2/2003 | Sakabe | |
| 2005/0234192 A1 | 10/2005 | Yamaguchi et al. | |
| 2007/0078221 A1 | 4/2007 | Choi et al. | |
| 2015/0005425 A1 | 1/2015 | Ahn et al. | |
| 2019/0023892 A1* | 1/2019 | Kang ...................... C08L 55/00 | |
| 2020/0115479 A1 | 4/2020 | Shibata et al. | |
| 2021/0115242 A1 | 4/2021 | Choi et al. | |

FOREIGN PATENT DOCUMENTS

| | | |
|---|---|---|
| CN | 1409727 A | 4/2003 |
| CN | 1688655 A | 10/2005 |
| JP | H06-299045 A | 10/1994 |
| JP | H09-194681 A | 7/1997 |
| JP | 2001-172303 A | 6/2001 |
| JP | 2003-335914 A | 11/2003 |
| JP | 2005-247887 A | 9/2005 |
| JP | 2008-260786 A | 10/2008 |
| KR | 2004-0108498 A | 12/2004 |
| KR | 10-2006-0021545 A | 3/2006 |
| KR | 10-2007-0064925 A | 6/2007 |
| KR | 10-0779159 B1 | 11/2007 |
| KR | 10-2015-0002476 A | 1/2015 |
| KR | 10-2016-0075415 A | 6/2016 |
| KR | 2016-0084733 A | 7/2016 |
| KR | 101748479 B1 * | 6/2017 |
| TW | 201903032 A | 1/2019 |
| TW | 202016206 A | 5/2020 |

OTHER PUBLICATIONS

International Search Report (with partial English translation) and Written Opinion issued in corresponding International Patent Application No. PCT/KR2021/003986 dated Jul. 19, 2021.
Office Action issued in corresponding Japanese Patent Application No. 2022-523335, dated Jun. 5, 2023. Note: JP2008260786 cited therein is already of record.
Office Action issued on May 8, 2024 for the corresponding Taiwanese patent application 110117279 Note: JP2008-260786 cited therein are already of record.
Office Action issued on May 18, 2024 for the corresponding Chinese patent application 202180005368.5.
Office Action issued in corresponding Chinese patent application 202180005368.5 dated Dec. 20, 2023 Note: JP2008260786A cited therein is already of record.
Extended European Search Report issued in corresponding European Patent Application No. 21808013.3 dated Dec. 7, 2022.

* cited by examiner

*Primary Examiner* — Joseph S Del Sole
(74) *Attorney, Agent, or Firm* — Morgan, Lewis & Bockius LLP

(57) ABSTRACT

Provided is a thermoplastic resin composition which includes: a rubber polymer including a first styrene-based monomer unit and a diene-based monomer unit in a weight ratio of 10:90 to 35:65 and having an average particle diameter of 250 to 450 nm; a (meth)acrylate-based monomer unit; and a second styrene-based monomer unit, wherein a weight ratio of the (meth)acrylate-based monomer unit to the second styrene-based monomer unit is 2 or less, and a weight-average molecular weight ranges from 130,000 to 250,000 g/mol.

10 Claims, No Drawings

THERMOPLASTIC RESIN COMPOSITION

CROSS-REFERENCE TO RELATED APPLICATIONS

This application claims priority to and the benefit of Korean Patent Application No. 10-2020-0060730, filed on May 21, 2020, and Korean Patent Application No. 10-2021-0041215, filed on Mar. 30, 2021, the disclosures of which are incorporated herein by reference in their entirety.

TECHNICAL FIELD

The present invention relates to a thermoplastic resin composition, and particularly, to a thermoplastic resin composition excellent in transparency, impact resistance, processability, chemical resistance, and gamma radiation resistance.

BACKGROUND ART

Recently, there have been many changes in the material industry in addition to environmental issues. In particular, many efforts have been made to replace polyvinyl chloride, polycarbonate, and the like, which have been conventionally used, due to issues such as environmental hormones or disposal for materials used as medical or food containers. Particularly, there is a need to develop new materials in the field of medical transparent materials used for syringes and tube connectors that are used while storing liquids therein.

Meanwhile, polycarbonate, polymethyl methacrylate, polystyrene, polyacrylonitrile-styrene, and the like are commonly used as transparent resins. Polycarbonate has excellent impact strength and excellent transparency, but the processability thereof is poor, which makes it difficult to produce complex products, and chemical resistance is not excellent. Also, the use of polycarbonate is increasingly restricted due to bisphenol A used in the preparation of polycarbonate. In addition, polymethyl methacrylate has excellent optical characteristics, but the impact resistance and chemical resistance thereof are not excellent. Additionally, polystyrene and polyacrylonitrile-styrene are not excellent in impact resistance and chemical resistance. In addition, diene-based graft polymers have excellent impact resistance and excellent processability while achieving the balance therebetween, but the transparency thereof is not excellent.

Therefore, there is a demand for the development of a medical material excellent in all of transparency, impact resistance, chemical resistance, and processability.

DISCLOSURE

Technical Problem

The present invention is directed to providing a thermoplastic resin composition that achieves the balance among transparency, impact resistance, and processability and is capable of reducing the usage amount of a (meth)acrylate-based monomer to improve chemical resistance and gamma radiation resistance and reduce manufacturing costs. The present invention is also directed to providing a thermoplastic resin composition that can be used for medical purposes.

Technical Solution

One aspect of the present invention provides a thermoplastic resin composition which includes: a rubber polymer including a first styrene-based monomer unit and a diene-based monomer unit in a weight ratio of 10:90 to 35:65 and having an average particle diameter of 250 to 450 nm; a (meth)acrylate-based monomer unit; and a second styrene-based monomer unit, wherein a weight ratio of the (meth) acrylate-based monomer unit to the second styrene-based monomer unit is 2 or less, and a weight-average molecular weight ranges from 130,000 to 250,000 g/mol.

Advantageous Effects

A thermoplastic resin composition of the present invention is not only excellent in transparency, impact resistance, processability, chemical resistance, and gamma radiation resistance but also capable of reducing the usage amount of a (meth)acrylate-based monomer, resulting in the reduction of manufacturing costs. Also, the thermoplastic resin composition can be used as a medical material.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the present invention, an average particle diameter may be measured by a dynamic light scattering method, specifically, by using a Nicomp 380 instrument (manufactured by Particle Sizing Systems). In the present invention, an average particle diameter may refer to an arithmetic average particle diameter in the particle size distribution as measured by a dynamic light scattering method, that is, an average particle diameter based on a scattering intensity distribution.

In the present invention, an average particle diameter may be measured using a transmission electron microscope (TEM).

In the present invention, a refractive index refers to an absolute refractive index of a material and is recognized as the ratio of the speed of electromagnetic radiation in free space to the speed of the radiation in the material, wherein the radiation may be visible light having a wavelength of 450 nm to 680 nm, specifically, visible light having a wavelength of 589.3 nm. A refractive index may be measured by a known method, i.e., by using an Abbe refractometer.

In the present invention, a refractive index may be measured at 25° C. with visible light having a wavelength of 589.3 nm using an Abbe refractometer after a graft copolymer and a non-grafted copolymer are cut to a thickness of 0.2 mm.

In the present invention, the weights of a rubber polymer, a diene-based monomer unit, a (meth)acrylate-based monomer unit, a first styrene-based monomer unit, and a second styrene-based monomer unit, which are included in a thermoplastic resin composition, may be measured by infrared (IR) spectroscopy. In this case, as an IR spectrometer, a Nicolet™ iS20 FTIR spectrometer (manufactured by Thermo Scientific) may be used.

In the present invention, the impact modifying part of a thermoplastic resin composition may refer to a part consisting of a rubber polymer and a monomer unit grafted onto the rubber polymer, and the matrix part of a thermoplastic resin composition may refer to a part excluding the impact modifying part and consisting of a monomer unit not grafted onto a rubber polymer in a graft copolymer and a monomer unit included in a non-grafted copolymer.

In the present invention, the weight-average molecular weight of a thermoplastic resin composition or a graft copolymer may be measured as a relative value with respect to a standard polystyrene (PS) sample by gel permeation chromatography (GPC) after the thermoplastic resin composition or graft copolymer is dissolved in acetone and then centrifuged to separate a supernatant and a precipitate, and the supernatant is dried, dissolved in tetrahydrofuran, and filtered.

Specifically, 1 g of a thermoplastic resin composition or graft copolymer powder is dissolved in 50 g of acetone while stirring for 24 hours and then centrifuged in a centrifuge (SUPRA 30 K manufactured by Hanil Science Industrial) at 16,000 rpm and $-10°$ C. for 4 hours to separate a supernatant and a precipitate, and the supernatant is dried in a hot-air dryer set at $50°$ C. for 12 hours to obtain a dry solid. The obtained dry solid is dissolved at a concentration of 1 wt % in tetrahydrofuran and then filtered through a 1 μm filter, and then a weight-average molecular weight is measured as a relative value with respect to a standard PS sample by GPC.

Meanwhile, in the GPC measurement, the Agilent 1200 series system may be used, and measurement conditions may be as follows.

---

Refractive index detector (RI): Agilent G1362 RID
RI temperature: $35°$ C.
Data processing: Agilent ChemStation S/W
Solvent: Tetrahydrofuran
Column temperature: $40°$ C.
Flow rate: 0.3 ml/min
Concentration of sample: 2.0 mg/ml
Input amount: 10 μl
Column models: 1 × PLgel 10 μm MiniMix-B (250 × 4.6 mm) +
1 × PLgel 10 μm MiniMix-B (250 × 4.6 mm) +
1 × PLgel 10 μm MiniMix-B Guard (50 × 4.6 mm)
Standard sample: Polystyrene

---

In the present invention, the weight-average molecular weight of a non-grafted copolymer may be measured as a relative value with respect to a standard PS sample by GPC using tetrahydrofuran as an eluent.

In the present invention, a first styrene-based monomer unit may refer to a styrene-based monomer unit included in a rubber polymer, and a second styrene-based monomer unit may refer to a styrene-based monomer unit included in a thermoplastic resin composition, but not included in the rubber polymer.

In the present invention, each of the first and second styrene-based monomer units may be a unit derived from a styrene-based monomer. The styrene-based monomer may be one or more selected from the group consisting of styrene, α-methyl styrene, α-ethyl styrene, and p-methyl styrene, with styrene being preferred.

In the present invention, a (meth)acrylate based monomer unit may be a unit derived from a (meth)acrylate based monomer. The (meth)acrylonitrile-based monomer may be a $C_1$ to $C_{10}$ alkyl (meth)acrylate-based monomer, and the $C_1$ to $C_{10}$ alkyl (meth)acrylate-based monomer may be one or more selected from the group consisting of methyl (meth) acrylate, ethyl (meth)acrylate, propyl (meth)acrylate, butyl (meth)acrylate, heptyl (meth)acrylate, hexyl (meth)acrylate, 2-ethylhexyl (meth)acrylate, and decyl (meth)acrylate, with methyl methacrylate being preferred.

In the present invention, an acrylonitrile-based monomer unit may be a unit derived from an acrylonitrile-based monomer. The acrylonitrile-based monomer may be one or more selected from the group consisting of acrylonitrile, methacrylonitrile, phenyl acrylonitrile, and α-chloroacrylonitrile, with acrylonitrile being preferred.

In the present invention, a diene-based monomer unit may be a unit derived from a diene-based monomer. The diene-based monomer may be one or more selected from the group consisting of 1,3-butadiene, isoprene, chloroprene, and piperylene, with 1,3-butadiene being preferred.

Thermoplastic Resin Composition

A thermoplastic resin composition according to an embodiment of the present invention includes: a rubber polymer including a first styrene-based monomer unit and a diene-based monomer unit in a weight ratio of 10:90 to 35:65 and having an average particle diameter of 250 to 450 nm; a (meth)acrylate-based monomer unit; and a second styrene-based monomer unit, wherein a weight ratio of the (meth)acrylate-based monomer unit to the second styrene-based monomer unit is 2 or less, and a weight-average molecular weight ranges from 130,000 to 250,000 g/mol.

The inventors of the present invention have found that a thermoplastic resin composition excellent in transparency, impact resistance, processability, chemical resistance, and gamma radiation resistance is prepared by adjusting the composition and average particle diameter of a rubber polymer, the weight ratio of a second styrene-based monomer unit and a (meth)acrylate-based monomer unit included in a thermoplastic resin composition, and a weight-average molecular weight, and completed the present invention based on this finding.

Hereinafter, the present invention will be described in detail.

When a rubber polymer includes only a diene-based monomer unit, to eliminate or minimize a difference in the refractive index between the impact modifying part and matrix part of a thermoplastic resin composition, an excessive amount of a (meth)acrylate-based monomer unit needs to be included in the matrix part. However, the (meth) acrylate-based monomer unit causes degradation of the chemical resistance of a thermoplastic resin composition and an increase in manufacturing costs due to the high cost of the monomer. In addition, a rubber polymer may not be prepared only using a styrene-based monomer. However, the rubber polymer according to the present invention includes not only a diene-based monomer unit but also a first styrene-based monomer unit to increase the refractive index of the rubber polymer, and accordingly, it is possible to include a small amount of a (meth)acrylate-based monomer unit in a matrix part. Therefore, the thermoplastic resin composition according to the present invention can minimize the problems such as degradation of chemical resistance and an increase in manufacturing costs which are caused by a (meth)acrylate-based monomer unit.

According to the embodiment of the present invention, the rubber polymer includes a first styrene-based monomer unit and a diene-based monomer unit in a weight ratio of 10:90 to 35:65, and preferably, in a weight ratio of 15:85 to 30:70. When the above-described condition is satisfied, it is possible to improve impact resistance and increase a refractive index, and thus the usage amount of a (meth)acrylate-based monomer unit can be reduced, and degradation of chemical resistance and an increase in manufacturing costs, which are caused by a (meth)acrylate-based monomer unit, can be minimized. However, when the content of the first styrene-based monomer unit is below the above-described range, chemical resistance and gamma radiation resistance may be substantially degraded. On the other hand, when the content of the first styrene-based monomer unit is above the above-described range, transparency and impact resistance may be substantially degraded.

Since the rubber polymer includes the diene-based monomer unit and the first styrene-based monomer unit in the above-described weight ratio, the refractive index thereof may be higher than that of a rubber polymer consisting of only a diene-based monomer. Specifically, the rubber polymer may have a refractive index of 1.5230 to 1.5420, and preferably, 1.5300 to 1.5400.

In addition, the rubber polymer included in the thermoplastic resin composition according to the embodiment of the present invention may have an average particle diameter of 250 to 450 nm, and preferably, 300 to 350 nm. When the thermoplastic resin composition according to the embodiment of the present invention includes a rubber polymer having an average particle diameter below the above-described range, processability and impact resistance may be substantially degraded. On the other hand, when the thermoplastic resin composition includes a rubber polymer having an average particle diameter above the above-described range, surface gloss characteristics may be degraded. In addition, a case in which a rubber polymer is prepared by emulsion polymerization is not preferred because the latex stability of the rubber polymer is substantially degraded.

In the thermoplastic resin composition according to the embodiment of the present invention, a weight ratio of the (meth)acrylate-based monomer unit to the second styrene-based monomer unit may be 2 or less, and preferably, 0.8 to 2. A case in which the weight ratio of the (meth)acrylate-based monomer unit to the second styrene-based monomer unit exceeds 2 means that an excessive amount of the (meth)acrylate-based monomer unit is included, and when the weight ratio of the (meth)acrylate-based monomer unit to the second styrene-based monomer unit exceeds 2, the chemical resistance of the thermoplastic resin composition may be substantially degraded, and manufacturing costs may be increased by addition of an excessive amount of (meth)acrylate-based monomer. On the other hand, when the weight ratio of the (meth)acrylate-based monomer unit to the second styrene-based monomer unit is less than 0.8, impact resistance may be degraded.

The thermoplastic resin composition according to the embodiment of the present invention may have a weight-average molecular weight of 130,000 to 250,000 g/mol, and preferably, 140,000 to 210,000 g/mol. The weight-average molecular weight refers to the weight-average molecular weight of a thermoplastic resin composition including a graft copolymer and a non-grafted copolymer to be described below, that is, a thermoplastic resin composition including an impact modifying part and a matrix part. When the weight-average molecular weight of the thermoplastic resin composition is below the above-described range, the chemical resistance of the thermoplastic resin composition may be degraded, and when above the above-described range, the processability of the thermoplastic resin composition may be degraded.

Meanwhile, the thermoplastic resin composition according to the embodiment of the present invention may include: the rubber polymer in an amount of 20.00 to 40.00 wt %; the (meth)acrylate-based monomer unit in an amount of 23.00 to 51.00 wt %; and the second styrene-based monomer unit in an amount of 18.00 to 41.00 wt %. Preferably, the thermoplastic resin composition includes: the rubber polymer in an amount of 27.00 to 37.00 wt %; the (meth) acrylate-based monomer unit in an amount of 27.00 to 45.00 wt %; and the second styrene-based monomer unit in an amount of 22.00 to 37.00 wt %. When the above-described condition is satisfied, a thermoplastic resin composition having improved properties in terms of impact resistance, chemical resistance, and processability can be prepared.

The thermoplastic resin composition according to the embodiment of the present invention may further include an acrylonitrile-based monomer unit to further improve chemical resistance. The acrylonitrile-based monomer unit may be included in an amount of 3.00 to 12.00 wt %, and preferably, 5.00 to 10.00 wt % to improve chemical resistance and minimize the occurrence of a yellowing phenomenon.

Meanwhile, the thermoplastic resin composition according to the embodiment of the present invention may include a graft copolymer and a non-grafted copolymer.

The graft copolymer may have a refractive index of 1.5230 to 1.5420, and preferably, 1.5300 to 1.5400. When the above-described range is satisfied, the refractive index of the graft copolymer is the same as or similar to that of the above-described rubber polymer, and thus the transparency of the graft copolymer can be further improved.

The refractive index of the graft copolymer and the refractive index of the non-grafted copolymer may differ by 0.0100 or less, and it is preferable that the difference is 0. When the above-described condition is satisfied, the thermoplastic resin composition can become more transparent.

A weight ratio of the graft copolymer and the non-grafted copolymer may be 40:60 to 80:20, and preferably, 50:50 to 70:30. When the above-described range is satisfied, processability can be further improved without degradation of impact resistance.

The graft copolymer may include a rubber polymer including a first styrene-based monomer unit and a diene-based monomer unit and having an average particle diameter of 250 to 450 nm, a (meth)acrylate-based monomer unit grafted onto the rubber polymer, and a second styrene-based monomer unit grafted onto the rubber polymer.

The rubber polymer included in the thermoplastic resin composition according to the embodiment of the present invention may be the same as the rubber polymer included in the graft copolymer.

The graft copolymer may include a (meth)acrylate-based monomer unit and a second styrene-based monomer unit which are not grafted onto the rubber polymer.

Meanwhile, the transparency of the graft copolymer may be determined by the refractive indexes of the rubber polymer and a shell including the monomer units grafted onto the rubber polymer. Also, the refractive index of the shell may be adjusted by a mixing ratio of the monomer units. That is, the refractive indices of the rubber polymer and the shell need to be similar to each other, and it is preferable that the refractive indices thereof are the same. Accordingly, the refractive index of the rubber polymer included in the graft copolymer and the refractive index of the monomer units grafted onto the rubber polymer may differ by 0.0100 or less, and it is preferable that the difference is 0. When the above-described condition is satisfied, the thermoplastic resin composition can become more transparent.

The graft copolymer may include the rubber polymer in an amount of 30.00 to 65.00 wt %, and preferably, 35.00 to 60.00 wt %. When the above-described range is satisfied, excellent impact resistance can be exhibited, and grafting is sufficiently performed in the preparation of the graft copolymer, and thus the graft copolymer can achieve excellent transparency.

The rubber polymer may include the first styrene-based monomer unit and the diene-based monomer unit in a weight ratio of 10:90 to 35:65, and preferably, in a weight ratio of 15:85 to 30:70. When the above-described condition is satisfied, it is possible to improve impact resistance and increase a refractive index, and thus the usage amount of a (meth)acrylate-based monomer unit can be reduced, degradation of chemical resistance and an increase in manufacturing costs, which are caused by a (meth)acrylate-based monomer unit, can be minimized. However, when the content of the first styrene-based monomer unit is below the above-described range, chemical resistance and gamma radiation resistance may be substantially degraded. On the other hand, when the content of the first styrene-based monomer unit is above the above-described range, transparency and impact resistance may be substantially degraded.

The graft copolymer may include the (meth)acrylate-based monomer unit in an amount of 11.00 to 46.00 wt %, and preferably, 15.00 to 40.00 wt %. When the above-described range is satisfied, the graft copolymer can achieve excellent transparency.

The graft copolymer may include the second styrene-based monomer unit in an amount of 10.00 to 36.00 wt %, and preferably, 15.00 to 30.00 wt %. When the above-described range is satisfied, the graft copolymer can achieve excellent processability.

The graft copolymer may further include an acrylonitrile-based monomer unit to further improve chemical resistance. The acrylonitrile-based monomer unit may be included in an amount of 9.00 wt % or less, and preferably, 1.00 to 9.00 wt % to improve chemical resistance and minimize the occurrence of a yellowing phenomenon.

The graft copolymer may have a weight-average molecular weight of 70,000 to 250,000 g/mol, and preferably, 100,000 to 200,000 g/mol. When the above-described range is satisfied, the chemical resistance and processability of the thermoplastic resin composition can be further improved.

In order to prepare the rubber polymer of the graft copolymer so that the rubber polymer has the above-described conditions, emulsion polymerization is preferably used.

The non-grafted copolymer may include a non-grafted copolymer including a (meth)acrylate-based monomer unit and a second styrene-based monomer unit.

The non-grafted copolymer may include the (meth)acrylate-based monomer unit in an amount of 45.00 to 70.00 wt %, and preferably, 50.00 to 65.00 wt %. When the above-described range is satisfied, a thermoplastic resin composition having improved transparency can be prepared.

The non-grafted copolymer may include the second styrene-based monomer unit in an amount of 30.00 to 55.00 wt %, and preferably, 35.00 to 50.00 wt %. When the above-described condition is satisfied, a thermoplastic resin composition having improved processability can be prepared.

The non-grafted copolymer may further include an acrylonitrile-based monomer unit to further improve chemical resistance. The acrylonitrile-based monomer unit may be included in an amount of 15.00 wt % or less, and preferably, 5.00 to 15.00 wt % to improve chemical resistance and minimize the occurrence of a yellowing phenomenon.

The non-grafted copolymer may have a weight-average molecular weight of 140,000 to 250,000 g/mol, and preferably, 160,000 to 230,000 g/mol. When the above-described range is satisfied, the chemical resistance and processability of the thermoplastic resin composition can be further improved.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention thereto.

Preparation Example 1: Preparation of Graft Copolymer Powder A-1

A monomer mixture consisting of 30 wt % of styrene and 70 wt % of 1,3-butadiene was subjected to emulsion polymerization to prepare styrene/butadiene rubber polymer latex having an average particle diameter of 350 nm and a refractive index of 1.5380.

21.20 parts by weight of methyl methacrylate, 20.80 parts by weight of styrene, 3.00 parts by weight of acrylonitrile, 100 parts by weight of ion exchanged water, 1.0 parts by weight of sodium oleate, 0.05 parts by weight of t-dodecyl mercaptan, 0.05 parts by weight of ethylenediamine tetraacetate, 0.1 parts by weight of sodium formaldehyde sulfoxylate, 0.001 parts by weight of ferrous sulfate, and 0.2 parts by weight of cumene hydroperoxide were homogeneously mixed to prepare a liquid mixture.

A reactor containing 55.00 parts by weight of the styrene/butadiene rubber polymer latex was heated to 75° C., and polymerization was performed while continuously adding the liquid mixture for 5 hours. After the continuous addition was terminated, the reactor was heated to 80° C., aging was performed for an hour, and the polymerization was terminated to obtain graft copolymer latex.

The graft copolymer latex was coagulated with calcium chloride, washed, dehydrated, and dried to obtain graft copolymer powder A-1 having a refractive index of 1.5380 and a weight-average molecular weight of 150,000 g/mol.

Preparation Example 2: Preparation of Graft Copolymer Powder A-2

A monomer mixture consisting of 10 wt % of styrene and 90 wt % of 1,3-butadiene was subjected to emulsion polymerization to prepare styrene/butadiene rubber polymer latex having an average particle diameter of 300 nm and a refractive index of 1.5230.

28.44 parts by weight of methyl methacrylate, 14.56 parts by weight of styrene, 7.00 parts by weight of acrylonitrile, 100 parts by weight of ion exchanged water, 1.0 parts by weight of sodium oleate, 0.07 parts by weight of t-dodecyl mercaptan, 0.05 parts by weight of ethylenediamine tetraacetate, 0.10 parts by weight of sodium formaldehyde sulfoxylate, 0.001 parts by weight of ferrous sulfate, and 0.2 parts by weight of cumene hydroperoxide were homogeneously mixed to prepare a liquid mixture.

A reactor containing 50.00 parts by weight of the styrene/butadiene rubber polymer latex was heated to 75° C., and polymerization was performed while continuously adding the liquid mixture for 5 hours. After the continuous addition was terminated, the reactor was heated to 80° C., aging was performed for an hour, and the polymerization was terminated to obtain graft copolymer latex.

The graft copolymer latex was coagulated with calcium chloride, washed, dehydrated, and dried to obtain graft copolymer powder A-2 having a refractive index of 1.523 and a weight-average molecular weight of 150,000 g/mol.

Preparation Example 3: Preparation of Graft Copolymer Powder A-3

A monomer mixture consisting of 15 wt % of styrene and 85 wt % of 1,3-butadiene was subjected to emulsion polymerization to prepare styrene/butadiene rubber polymer latex having an average particle diameter of 300 nm and a refractive index of 1.5268.

26.58 parts by weight of methyl methacrylate, 16.42 parts by weight of styrene, 7.00 parts by weight of acrylonitrile, 100 parts by weight of ion exchanged water, 1.0 parts by weight of sodium oleate, 0.05 parts by weight of t-dodecyl mercaptan, 0.05 parts by weight of ethylenediamine tetraacetate, 0.10 parts by weight of sodium formaldehyde sulfoxylate, 0.001 parts by weight of ferrous sulfate, and 0.2 parts by weight of cumene hydroperoxide were homogeneously mixed to prepare a liquid mixture.

A reactor containing 50.00 parts by weight of the styrene/butadiene rubber polymer latex was heated to 75° C., and polymerization was performed while continuously adding the liquid mixture for 5 hours. After the continuous addition was terminated, the reactor was heated to 80° C., aging was performed for an hour, and the polymerization was terminated to obtain graft copolymer latex.

The graft copolymer latex was coagulated with calcium chloride, washed, dehydrated, and dried to obtain graft copolymer powder A-3 having a refractive index of 1.5268 and a weight-average molecular weight of 170,000 g/mol.

Preparation Example 4: Preparation of Graft Copolymer Powder A-4

A monomer mixture consisting of 23 wt % of styrene and 77 wt % of 1,3-butadiene was subjected to emulsion polymerization to prepare styrene/butadiene rubber polymer latex having an average particle diameter of 300 nm and a refractive index of 1.5330.

24.90 parts by weight of methyl methacrylate, 20.10 parts by weight of styrene, 5.00 parts by weight of acrylonitrile, 100 parts by weight of ion exchanged water, 1.0 parts by weight of sodium oleate, 0.10 parts by weight of t-dodecyl mercaptan, 0.050 parts by weight of ethylenediamine tetraacetate, 0.100 parts by weight of sodium formaldehyde sulfoxylate, 0.001 parts by weight of ferrous sulfate, and 0.2 parts by weight of cumene hydroperoxide were homogeneously mixed to prepare a liquid mixture.

A reactor containing 50.00 parts by weight (based on solid content) of the styrene/butadiene rubber polymer latex was heated to 75° C., and polymerization was performed while continuously adding the liquid mixture for 5 hours. After the continuous addition was terminated, the reactor was heated to 80° C., aging was performed for an hour, and the polymerization was terminated to obtain graft copolymer latex.

The graft copolymer latex was coagulated with calcium chloride, washed, dehydrated, and dried to obtain graft copolymer powder A-4 having a refractive index of 1.5330 and a weight-average molecular weight of 130,000 g/mol.

Preparation Example 5: Preparation of Graft Copolymer Powder A-5

A monomer mixture consisting of 30 wt % of styrene and 70 wt % of 1,3-butadiene was subjected to emulsion polymerization to prepare styrene/butadiene rubber polymer latex having an average particle diameter of 300 nm and a refractive index of 1.5379.

21.00 parts by weight of methyl methacrylate, 22.00 parts by weight of styrene, 7.00 parts by weight of acrylonitrile, 100 parts by weight of ion exchanged water, 1.0 parts by weight of sodium oleate, 0.1 parts by weight of t-dodecyl mercaptan, 0.05 parts by weight of ethylenediamine tetraacetate, 0.1 parts by weight of sodium formaldehyde sulfoxylate, 0.001 parts by weight of ferrous sulfate, and 0.2 parts by weight of cumene hydroperoxide were homogeneously mixed to prepare a liquid mixture.

A reactor containing 50.00 parts by weight of the styrene/butadiene rubber polymer latex was heated to 75° C., and polymerization was performed while continuously adding the liquid mixture for 5 hours. After the continuous addition was terminated, the reactor was heated to 80° C., aging was performed for an hour, and the polymerization was terminated to obtain graft copolymer latex.

The graft copolymer latex was coagulated with calcium chloride, washed, dehydrated, and dried to obtain graft copolymer powder A-5 having a refractive index of 1.5379 and a weight-average molecular weight of 150,000 g/mol.

Preparation Example 6: Preparation of Graft Copolymer Powder A-6

A monomer mixture consisting of 35 wt % of styrene and 65 wt % of 1,3-butadiene was subjected to emulsion polymerization to prepare styrene/butadiene rubber polymer latex having an average particle diameter of 300 nm and a refractive index of 1.5416.

20.58 parts by weight of methyl methacrylate, 24.42 parts by weight of styrene, 5.00 parts by weight of acrylonitrile, 100 parts by weight of ion exchanged water, 1.0 parts by weight of sodium oleate, 0.03 parts by weight of t-dodecyl mercaptan, 0.05 parts by weight of ethylenediamine tetraacetate, 0.1 parts by weight of sodium formaldehyde sulfoxylate, 0.001 parts by weight of ferrous sulfate, and 0.2 parts by weight of cumene hydroperoxide were homogeneously mixed to prepare a liquid mixture.

A reactor containing 50.00 parts by weight of the styrene/butadiene rubber polymer latex was heated to 75° C., and polymerization was performed while continuously adding the liquid mixture for 5 hours. After the continuous addition was terminated, the reactor was heated to 80° C., aging was performed for an hour, and the polymerization was terminated to obtain graft copolymer latex.

The graft copolymer latex was coagulated with calcium chloride, washed, dehydrated, and dried to obtain graft copolymer powder A-6 having a refractive index of 1.5416 and a weight-average molecular weight of 190,000 g/mol.

Preparation Example 7: Preparation of Graft Copolymer Powder A-7

A monomer mixture consisting of 6 wt % of styrene and 94 wt % of 1,3-butadiene was subjected to emulsion polymerization to prepare styrene/butadiene rubber polymer latex having an average particle diameter of 300 nm and a refractive index of 1.5200.

31.37 parts by weight of methyl methacrylate, 13.63 parts by weight of styrene, 5.00 parts by weight of acrylonitrile, 100 parts by weight of ion exchanged water, 1.0 parts by weight of sodium oleate, 0.10 parts by weight of t-dodecyl mercaptan, 0.05 parts by weight of ethylenediamine tetraacetate, 0.1 parts by weight of sodium formaldehyde sulfoxylate, 0.001 parts by weight of ferrous sulfate, and 0.2 parts by weight of cumene hydroperoxide were homogeneously mixed to prepare a liquid mixture.

A reactor containing 50.00 parts by weight of the styrene/butadiene rubber polymer latex was heated to 75° C., and polymerization was performed while continuously adding the liquid mixture for 5 hours. After the continuous addition was terminated, the reactor was heated to 80° C., aging was performed for an hour, and the polymerization was terminated to obtain graft copolymer latex.

The graft copolymer latex was coagulated with calcium chloride, washed, dehydrated, and dried to obtain graft copolymer powder A-7 having a refractive index of 1.52 and a weight-average molecular weight of 130,000 g/mol.

Preparation Example 8: Preparation of Graft Copolymer Powder A-8

A monomer mixture consisting of 40 wt % of styrene and 60 wt % of 1,3-butadiene was subjected to emulsion polymerization to prepare styrene/butadiene rubber polymer latex having an average particle diameter of 300 nm and a refractive index of 1.5454.

18.72 parts by weight of methyl methacrylate, 26.28 parts by weight of styrene, 5.00 parts by weight of acrylonitrile, 100 parts by weight of ion exchanged water, 1.0 parts by weight of sodium oleate, 0.10 parts by weight of t-dodecyl mercaptan, 0.05 parts by weight of ethylenediamine tetraacetate, 0.1 parts by weight of sodium formaldehyde sulfoxylate, 0.001 parts by weight of ferrous sulfate, and 0.2 parts by weight of cumene hydroperoxide were homogeneously mixed to prepare a liquid mixture.

A reactor containing 50.00 parts by weight of the styrene/butadiene rubber polymer latex was heated to 75° C., and polymerization was performed while continuously adding the liquid mixture for 5 hours. After the continuous addition was terminated, the reactor was heated to 80° C., aging was performed for an hour, and the polymerization was terminated to obtain graft copolymer latex.

The graft copolymer latex was coagulated with calcium chloride, washed, dehydrated, and dried to obtain graft copolymer powder A-8 having a refractive index of 1.5454 and a weight-average molecular weight of 130,000 g/mol.

Preparation Example 9: Preparation of Graft Copolymer Powder A-9

1,3-butadiene was subjected to emulsion polymerization to prepare butadiene rubber polymer latex having an average particle diameter of 300 nm and a refractive index of 1.5160.

24.90 parts by weight of methyl methacrylate, 20.10 parts by weight of styrene, 5.00 parts by weight of acrylonitrile, 100 parts by weight of ion exchanged water, 1.0 parts by weight of sodium oleate, 0.10 parts by weight of t-dodecyl mercaptan, 0.05 parts by weight of ethylenediamine tetraacetate, 0.1 parts by weight of sodium formaldehyde sulfoxylate, 0.001 parts by weight of ferrous sulfate, and 0.2 parts by weight of cumene hydroperoxide were homogeneously mixed to prepare a liquid mixture.

A reactor containing 50.00 parts by weight of the butadiene rubber polymer latex was heated to 75° C., and polymerization was performed while continuously adding the liquid mixture for 5 hours. After the continuous addition was terminated, the reactor was heated to 80° C., aging was performed for an hour, and the polymerization was terminated to obtain graft copolymer latex.

The graft copolymer latex was coagulated with calcium chloride, washed, dehydrated, and dried to obtain graft copolymer powder A-9 having a refractive index of 1.5454 and a weight-average molecular weight of 130,000 g/mol. The graft copolymer powder A-9 became opaque due to a difference in refractive index between the butadiene rubber polymer and a hard copolymer grafted onto the butadiene rubber polymer, and therefore, the refractive index thereof was not measured.

Preparation Example 10: Preparation of Graft Copolymer Powder A-10

A monomer mixture consisting of 23 wt % of styrene and 77 wt % of 1,3-butadiene was subjected to emulsion polymerization to prepare styrene/butadiene rubber polymer latex having an average particle diameter of 100 nm and a refractive index of 1.5330.

24.90 parts by weight of methyl methacrylate, 20.10 parts by weight of styrene, 5.00 parts by weight of acrylonitrile, 100 parts by weight of ion exchanged water, 1.0 parts by weight of sodium oleate, 0.10 parts by weight of t-dodecyl mercaptan, 0.05 parts by weight of ethylenediamine tetraacetate, 0.1 parts by weight of sodium formaldehyde sulfoxylate, 0.001 parts by weight of ferrous sulfate, and 0.2 parts by weight of cumene hydroperoxide were homogeneously mixed to prepare a liquid mixture.

A reactor containing 50.00 parts by weight of the styrene/butadiene rubber polymer latex was heated to 75° C., and polymerization was performed while continuously adding the liquid mixture for 5 hours. After the continuous addition was terminated, the reactor was heated to 80° C., aging was performed for an hour, and the polymerization was terminated to obtain graft copolymer latex.

The graft copolymer latex was coagulated with calcium chloride, washed, dehydrated, and dried to obtain graft copolymer powder A-10 having a refractive index of 1.5330 and a weight-average molecular weight of 100,000 g/mol.

Preparation Example 11: Preparation of Graft Copolymer Powder A-11

A monomer mixture consisting of 30 wt % of styrene and 70 wt % of 1,3-butadiene was subjected to emulsion polymerization to prepare styrene/butadiene rubber polymer latex having an average particle diameter of 350 nm and a refractive index of 1.5380.

21.20 parts by weight of methyl methacrylate, 20.80 parts by weight of styrene, 3.00 parts by weight of acrylonitrile, 100 parts by weight of ion exchanged water, 1.0 parts by weight of sodium oleate, 0.20 parts by weight of t-dodecyl mercaptan, 0.3 parts by weight of ethylenediamine tetraacetate, 0.1 parts by weight of sodium formaldehyde sulfoxylate, 0.001 parts by weight of ferrous sulfate, and 0.2 parts by weight of cumene hydroperoxide were homogeneously mixed to prepare a liquid mixture.

A reactor containing 55.00 parts by weight of the styrene/butadiene rubber polymer latex was heated to 75° C., and polymerization was performed while continuously adding the liquid mixture for 5 hours. After the continuous addition was terminated, the reactor was heated to 80° C., aging was performed for an hour, and the polymerization was terminated to obtain graft copolymer latex.

The graft copolymer latex was coagulated with calcium chloride, washed, dehydrated, and dried to obtain graft copolymer powder A-11 having a refractive index of 1.5380 and a weight-average molecular weight of 80,000 g/mol.

Preparation Example 12: Preparation of Graft Copolymer Powder A-12

A monomer mixture consisting of 10 wt % of styrene and 90 wt % of 1,3-butadiene was subjected to emulsion polymerization to prepare styrene/butadiene rubber polymer latex having an average particle diameter of 300 nm and a refractive index of 1.5230.

33.00 parts by weight of methyl methacrylate, 16.00 parts by weight of styrene, 1.00 parts by weight of acrylonitrile, 100 parts by weight of ion exchanged water, 1.0 parts by weight of sodium oleate, 0.15 parts by weight of t-dodecyl mercaptan, 0.05 parts by weight of ethylenediamine tetraacetate, 0.1 parts by weight of sodium formaldehyde sulfoxylate, 0.001 parts by weight of ferrous sulfate, and 0.2 parts by weight of cumene hydroperoxide were homogeneously mixed to prepare a liquid mixture.

A reactor containing 50.00 parts by weight of the styrene/butadiene rubber polymer latex was heated to 75° C., and polymerization was performed while continuously adding the liquid mixture for 5 hours. After the continuous addition was terminated, the reactor was heated to 80° C., aging was performed for an hour, and the polymerization was terminated to obtain graft copolymer latex.

The graft copolymer latex was coagulated with calcium chloride, washed, dehydrated, and dried to obtain graft copolymer powder A-12 having a refractive index of 1.5230 and a weight-average molecular weight of 130,000 g/mol.

Preparation Example 13: Preparation of Graft Copolymer Powder A-13

1,3-butadiene was subjected to emulsion polymerization to prepare butadiene rubber polymer latex having an average particle diameter of 300 nm and a refractive index of 1.5160.

35.00 parts by weight of methyl methacrylate, 12.00 parts by weight of styrene, 3.00 parts by weight of acrylonitrile, 100 parts by weight of ion exchanged water, 1.0 parts by weight of sodium oleate, 0.5 parts by weight of t-dodecyl mercaptan, 0.05 parts by weight of ethylenediamine tetraacetate, 0.1 parts by weight of sodium formaldehyde sulfoxylate, 0.001 parts by weight of ferrous sulfate, and 0.2 parts by weight of cumene hydroperoxide were homogeneously mixed to prepare a liquid mixture.

A reactor containing 50.00 parts by weight of the butadiene rubber polymer latex was heated to 75° C., and polymerization was performed while continuously adding the liquid mixture for 5 hours. After the continuous addition was terminated, the reactor was heated to 80° C., aging was performed for an hour, and the polymerization was terminated to obtain graft copolymer latex.

The graft copolymer latex was coagulated with calcium chloride, washed, dehydrated, and dried to obtain graft copolymer powder A-13 having a refractive index of 1.5160 and a weight-average molecular weight of 100,000 g/mol.

Preparation Example 14: Preparation of Non-Grafted Copolymer Pellet B-1

A liquid mixture including 44.10 parts by weight of methyl methacrylate, 44.90 parts by weight of styrene, 11.00 parts by weight of acrylonitrile, 30 parts by weight of toluene, and 0.05 parts by weight of n-octyl mercaptan was continuously added to a reactor for an average polymerization time of 3 hours. In this case, a polymerization temperature was maintained at 148° C. The polymerization solution continuously discharged from the reactor was heated in a preheating bath, and unreacted monomers and a solvent were volatilized in a volatilization tank. Subsequently, the resulting polymer was extruded using a polymer transfer pump extruder while maintaining a temperature of 210° C., thereby preparing a non-grafted copolymer pellet B-1 having a refractive index of 1.5380 and a weight-average molecular weight of 200,000 g/mol.

Preparation Example 15: Preparation of Non-Grafted Copolymer Pellet B-2

A liquid mixture including 60.52 parts by weight of methyl methacrylate, 30.48 parts by weight of styrene, 9.00 parts by weight of acrylonitrile, 30 parts by weight of toluene, and 0.06 parts by weight of n-octyl mercaptan was continuously added to a reactor for an average polymerization time of 3 hours. In this case, a polymerization temperature was maintained at 148° C. The polymerization solution continuously discharged from the reactor was heated in a preheating bath, and unreacted monomers and a solvent were volatilized in a volatilization tank. Subsequently, the resulting polymer was extruded using a polymer transfer pump extruder while maintaining a temperature of 210° C., thereby preparing a non-grafted copolymer pellet B-2 having a refractive index of 1.5230 and a weight-average molecular weight of 190,000 g/mol.

Preparation Example 16: Preparation of Non-Grafted Copolymer Pellet B-3

A liquid mixture including 56.72 parts by weight of methyl methacrylate, 34.28 parts by weight of styrene, 9.00 parts by weight of acrylonitrile, 30 parts by weight of toluene, and 0.06 parts by weight of n-octyl mercaptan was continuously added to a reactor for an average polymerization time of 3 hours. In this case, a polymerization temperature was maintained at 148° C. The polymerization solution continuously discharged from the reactor was heated in a preheating bath, and unreacted monomers and a solvent were volatilized in a volatilization tank. Subsequently, the resulting polymer was extruded using a polymer transfer pump extruder while maintaining a temperature of 210° C., thereby preparing a non-grafted copolymer pellet B-3 having a refractive index of 1.5268 and a weight-average molecular weight of 190,000 g/mol.

Preparation Example 17: Preparation of Non-Grafted Copolymer Pellet B-4

A liquid mixture including 52.00 parts by weight of methyl methacrylate, 39.00 parts by weight of styrene, 9.00 parts by weight of acrylonitrile, 30 parts by weight of toluene, and 0.06 parts by weight of n-octyl mercaptan was continuously added to a reactor for an average polymerization time of 3 hours. In this case, a polymerization temperature was maintained at 148° C. The polymerization solution continuously discharged from the reactor was heated in a preheating bath, and unreacted monomers and a solvent were volatilized in a volatilization tank. Subsequently, the resulting polymer was extruded using a polymer transfer pump extruder while maintaining a temperature of 210° C., thereby preparing a non-grafted copolymer pellet B-4 having a refractive index of 1.5315 and a weight-average molecular weight of 190,000 g/mol.

Preparation Example 18: Preparation of Non-Grafted Copolymer Pellet B-5

A liquid mixture including 45.62 parts by weight of methyl methacrylate, 45.38 parts by weight of styrene, 9.00 parts by weight of acrylonitrile, 30 parts by weight of toluene, and 0.06 parts by weight of n-octyl mercaptan was continuously added to a reactor for an average polymerization time of 3 hours. In this case, a polymerization temperature was maintained at 148° C. The polymerization solution continuously discharged from the reactor was heated in a preheating bath, and unreacted monomers and a solvent were volatilized in a volatilization tank. Subsequently, the resulting polymer was extruded using a polymer transfer pump extruder while maintaining a temperature of 210° C., thereby preparing a non-grafted copolymer pellet B-5 having a refractive index of 1.5379 and a weight-average molecular weight of 190,000 g/mol.

Preparation Example 19: Preparation of Non-Grafted Copolymer Pellet B-6

A liquid mixture including 41.92 parts by weight of methyl methacrylate, 49.08 parts by weight of styrene, 9.00 parts by weight of acrylonitrile, 30 parts by weight of toluene, and 0.06 parts by weight of n-octyl mercaptan was continuously added to a reactor for an average polymerization time of 3 hours. In this case, a polymerization temperature was maintained at 148° C. The polymerization solution continuously discharged from the reactor was heated in a preheating bath, and unreacted monomers and a solvent were volatilized in a volatilization tank. Subsequently, the resulting polymer was extruded using a polymer transfer pump extruder while maintaining a temperature of 210° C., thereby preparing a non-grafted copolymer pellet B-6 having a refractive index of 1.5416 and a weight-average molecular weight of 190,000 g/mol.

Preparation Example 20: Preparation of Non-Grafted Copolymer Pellet B-7

A liquid mixture including 63.52 parts by weight of methyl methacrylate, 27.48 parts by weight of styrene, 9.00 parts by weight of acrylonitrile, 30 parts by weight of toluene, and 0.06 parts by weight of n-octyl mercaptan was continuously added to a reactor for an average polymerization time of 3 hours. In this case, a polymerization temperature was maintained at 148° C. The polymerization solution continuously discharged from the reactor was heated in a preheating bath, and unreacted monomers and a solvent were volatilized in a volatilization tank. Subsequently, the resulting polymer was extruded using a polymer transfer pump extruder while maintaining a temperature of 210° C., thereby preparing a non-grafted copolymer pellet B-7 having a refractive index of 1.5200 and a weight-average molecular weight of 190,000 g/mol.

Preparation Example 21: Preparation of Non-Grafted Copolymer Pellet B-8

A liquid mixture including 38.12 parts by weight of methyl methacrylate, 52.88 parts by weight of styrene, 9.00 parts by weight of acrylonitrile, 30 parts by weight of toluene, and 0.06 parts by weight of n-octyl mercaptan was continuously added to a reactor for an average polymerization time of 3 hours. In this case, a polymerization temperature was maintained at 148° C. The polymerization solution continuously discharged from the reactor was heated in a preheating bath, and unreacted monomers and a solvent were volatilized in a volatilization tank. Subsequently, the resulting polymer was extruded using a polymer transfer pump extruder while maintaining a temperature of 210° C., thereby preparing a non-grafted copolymer pellet B-8 having a refractive index of 1.5454 and a weight-average molecular weight of 190,000 g/mol.

Preparation Example 22: Preparation of Non-Grafted Copolymer Pellet B-9

A liquid mixture including 56.72 parts by weight of methyl methacrylate, 34.28 parts by weight of styrene, 9.00 parts by weight of acrylonitrile, 30 parts by weight of toluene, and 0.01 parts by weight of n-octyl mercaptan was continuously added to a reactor for an average polymerization time of 3 hours. In this case, a polymerization temperature was maintained at 148° C. The polymerization solution continuously discharged from the reactor was heated in a preheating bath, and unreacted monomers and a solvent were volatilized in a volatilization tank. Subsequently, the resulting polymer was extruded using a polymer transfer pump extruder while maintaining a temperature of 210° C., thereby preparing a non-grafted copolymer pellet B-9 having a refractive index of 1.5268 and a weight-average molecular weight of 350,000 g/mol.

Preparation Example 23: Preparation of Non-Grafted Copolymer Pellet B-10

A liquid mixture including 44.10 parts by weight of methyl methacrylate, 44.90 parts by weight of styrene, 11.00 parts by weight of acrylonitrile, 30 parts by weight of toluene, and 0.3 parts by weight of n-octyl mercaptan was continuously added to a reactor for an average polymerization time of 3 hours. In this case, a polymerization temperature was maintained at 148° C. The polymerization solution continuously discharged from the reactor was heated in a preheating bath, and unreacted monomers and a solvent were volatilized in a volatilization tank. Subsequently, the resulting polymer was extruded using a polymer transfer pump extruder while maintaining a temperature of 210° C., thereby preparing a non-grafted copolymer pellet B-10 having a refractive index of 1.5380 and a weight-average molecular weight of 90,000 g/mol.

Preparation Example 24: Preparation of Non-Grafted Copolymer Pellet B-11

A liquid mixture including 63.50 parts by weight of methyl methacrylate, 31.50 parts by weight of styrene, 5.00 parts by weight of acrylonitrile, 30 parts by weight of toluene, and 0.08 parts by weight of n-octyl mercaptan was continuously added to a reactor for an average polymerization time of 3 hours. In this case, a polymerization temperature was maintained at 148° C. The polymerization solution continuously discharged from the reactor was heated in a preheating bath, and unreacted monomers and a solvent were volatilized in a volatilization tank. Subsequently, the resulting polymer was extruded using a polymer transfer pump extruder while maintaining a temperature of 210° C., thereby preparing a non-grafted copolymer pellet B-11 having a refractive index of 1.5230 and a weight-average molecular weight of 190,000 g/mol.

Preparation Example 25: Preparation of Non-Grafted Copolymer Pellet B-12

A liquid mixture including 70.40 parts by weight of methyl methacrylate, 24.60 parts by weight of styrene, 5.00 parts by weight of acrylonitrile, 30 parts by weight of toluene, and 0.1 parts by weight of n-octyl mercaptan was continuously added to a reactor for an average polymerization time of 3 hours. In this case, a polymerization temperature was maintained at 148° C. The polymerization solution continuously discharged from the reactor was heated in a preheating bath, and unreacted monomers and a solvent were volatilized in a volatilization tank. Subsequently, the resulting polymer was extruded using a polymer transfer pump extruder while maintaining a temperature of 210° C., thereby preparing a non-grafted copolymer pellet B-12 having a refractive index of 1.5160 and a weight-average molecular weight of 150,000 g/mol.

EXAMPLES AND COMPARATIVE EXAMPLES

Graft copolymer powder and a non-grafted copolymer pellet were homogeneously mixed in contents shown in Tables 1 to 3 below to prepare a thermoplastic resin composition.

Experimental Example 1

Physical properties of the thermoplastic resin compositions according to Examples and Comparative Examples were measured by methods described below, and results thereof are shown in Tables 1 to 3.

1) Weight-average molecular weight (g/mol): 1 g of the thermoplastic resin composition was dissolved in 50 g of acetone while stirring for 24 hours and then centrifuged in a centrifuge (SUPRA 30 K manufactured by Hanil Science Industrial) at 16,000 rpm and −10° C. for 4 hours to separate a supernatant and a precipitate, and the supernatant was dried in a hot-air dryer set at 50° C. for 12 hours to obtain a dry solid. The obtained dry solid was dissolved at a concentration of 1 wt % in tetrahydrofuran and then filtered through a 1 μm filter, and then a weight-average molecular weight was measured as a relative value with respect to a standard polystyrene sample by gel permeation chromatography (GPC).

Meanwhile, in the GPC measurement, the Agilent 1200 series system was used, and measurement conditions are as follows.

Refractive index detector (RI): Agilent G1362 RID
RI temperature: 35° C.
Data processing: Agilent ChemStation S/W
Solvent: Tetrahydrofuran
Column temperature: 40° C.
Flow rate: 0.3 ml/min
Concentration of sample: 2.0 mg/ml
Input amount: 10 μl
Column models: 1 × PLgel 10 μm MiniMix-B (250 × 4.6 mm) +
1 × PLgel 10 μm MiniMix-B (250 × 4.6 mm) +
1 × PLgel 10μm MiniMix-B Guard (50 × 4.6 mm)
Standard sample: Polystyrene 2) Methyl methacrylate unit/Second styrene unit (MMA unit/ST unit): The weights of a styrene unit not included in a rubber polymer and a methyl methacrylate unit in the thermoplastic resin composition were derived by infrared (IR) spectroscopy using a Nicolet™ iS20 FTIR spectrometer (manufactured by Thermo Scientific), and then a weight ratio of the methyl methacrylate unit to the styrene unit was calculated.

Experimental Example 2

100 parts by weight of each of the thermoplastic resin compositions according to Examples and Comparative Examples, 0.3 parts by weight of a lubricant, and 0.2 parts by weight of an antioxidant were homogeneously mixed, and then the resulting mixture was extruded using a twin-screw extrusion kneader whose cylinder temperature was 220° C. to prepare a pellet. A physical property of the pellet was measured by a method described below, and results thereof are shown in Tables 1 to 3.

1) Melt flow index (g/10 min): measured under conditions of 220° C. and 10 kg in accordance with ASTM D1238.

Experimental Example 3

The pellet prepared in Experimental Example 2 was injection-molded to prepare a specimen. Physical properties of the specimen were measured by methods described below, and results thereof are shown in Tables 1 to 3 below.

1) Haze value (%): The transparency of the specimen (thickness: ⅛ inch) was measured in accordance with ASTM D1003.

2) Notched IZOD impact strength (kgf·cm/cm, ¼ inch): measured at 23° C. in accordance with ASTM D256.

3) Chemical resistance: A specimen fixed to a 0.5% strain jig was coated with 70% isopropyl alcohol and then observed for 10 minutes. A case in which there are no changes was indicated as OK, and a case in which cracks occur was indicated as NG.

4) Gamma radiation discoloration: L, a, and b values for a 3 mm-thick specimen were measured in accordance with ASTM D2244. Also, after a 3 mm-thick specimen was irradiated with gamma rays and stored for 21 days, L, a, and b values were measured in accordance with ASTM D2244.

$$\Delta E = \sqrt{(L_1 - L_2)^2 + (a_1 - a_2)^2 + (b_1 - b_2)^2}$$

In the above equation, $L_1$, $a_1$, and $b_1$ are the L, a, and b values measured in the CIE LAB color coordinate system after a specimen irradiated with gamma rays was stored for 21 days, and $L_2$, $a_2$, and $b_2$ are the L, a, and b values measured in the CIE LAB color coordinate system for a specimen not irradiated with gamma rays.

TABLE 1

| Classification | | Examples | | | | | |
|---|---|---|---|---|---|---|---|
| | | 1 | 2 | 3 | 4 | 5 | 6 |
| Graft copolymer powder | Content (parts by weight) | 65 | 60 | 60 | 60 | 60 | 60 |
| | Type | A-1 | A-2 | A-3 | A-4 | A-5 | A-6 |
| | Refractive index | 1.5380 | 1.5230 | 1.5268 | 1.5330 | 1.5379 | 1.5416 |
| | Weight-average molecular weight | 150,000 | 150,000 | 170,000 | 130,000 | 150,000 | 190,000 |
| | Rubber polymer  ST (wt %) | 30 | 10 | 15 | 23 | 30 | 35 |
| | BD (wt %) | 70 | 90 | 85 | 77 | 70 | 65 |
| | Average particle diameter | 350 | 300 | 300 | 300 | 300 | 300 |
| | Refractive index | 1.5380 | 1.5230 | 1.5268 | 1.5330 | 1.5379 | 1.5416 |
| | Rubber polymer and monomers (parts by weight)  Rubber polymer | 55.00 | 50.00 | 50.00 | 50.00 | 50.00 | 50.00 |
| | MMA | 21.20 | 28.44 | 26.58 | 24.90 | 21.00 | 20.58 |
| | ST | 20.80 | 14.56 | 16.42 | 20.10 | 22.00 | 24.42 |
| | AN | 3.00 | 7.00 | 7.00 | 5.00 | 7.00 | 5.00 |
| Non-grafted copolymer | Content (parts by weight) | 35 | 40 | 40 | 40 | 40 | 40 |
| | Type | B-1 | B-2 | B-3 | B-4 | B-5 | B-6 |
| | Refractive index | 1.5380 | 1.5230 | 1.5268 | 1.5315 | 1.5379 | 1.5416 |
| | Weight-average molecular weight | 200,000 | 190,000 | 190,000 | 190,000 | 190,000 | 190,000 |
| | Monomers (parts by weight)  MMA | 44.10 | 60.52 | 56.72 | 52.00 | 45.62 | 41.92 |
| | ST | 44.90 | 30.48 | 34.28 | 39.00 | 45.38 | 49.08 |
| | AN | 11.00 | 9.00 | 9.00 | 9.00 | 9.00 | 9.00 |
| Thermoplastic resin composition | MMA unit/ST unit | about 1.00 | about 1.97 | about 1.64 | about 1.29 | about 0.98 | about 0.84 |
| | Weight-average molecular weight | 180,000 | 170,000 | 180,000 | 170,000 | 170,000 | 190,000 |
| | Melt flow index | 2.5 | 2.5 | 2.3 | 3.0 | 2.8 | 3.0 |
| | Haze value | 2.4 | 2.0 | 2.1 | 2.1 | 2.2 | 2.3 |
| | Impact strength | 24 | 25 | 23 | 20 | 18 | 15 |
| | Chemical resistance | OK | OK | OK | OK | OK | OK |
| | Gamma radiation discoloration | 1.5 | 2.7 | 2.4 | 2.1 | 1.8 | 1.7 |

ST: styrene,
BD: 1,3-butadiene,
MMA: methyl methacrylate,
AN: acrylonitrile

40

TABLE 2

| Classification | | Comparative Examples 1 | Comparative Examples 2 | Comparative Examples 3 | Comparative Examples 4 | Comparative Examples 5 |
|---|---|---|---|---|---|---|
| Graft copolymer powder | Content (parts by weight) | 60 | 60 | 60 | 60 | 60 |
| | Type | A-7 | A-8 | A-3 | A-9 | A-10 |
| | Refractive index | 1.5200 | 1.5454 | 1.5268 | not measurable | 1.5330 |
| | Weight-average molecular weight | 130,000 | 130,000 | 170,000 | 130,000 | 100,000 |
| | Rubber polymer  ST (wt %) | 6 | 40 | 15 | 0 | 23 |
| | BD (wt %) | 94 | 60 | 85 | 100 | 77 |
| | Average particle diameter | 300 | 300 | 300 | 300 | 100 |
| | Refractive index | 1.5200 | 1.5454 | 1.5268 | 1.5160 | 1.5330 |
| | Rubber polymer and monomers (parts by weight)  Rubber polymer | 50.00 | 50.00 | 50.00 | 50.00 | 50.00 |
| | MMA | 31.37 | 18.72 | 26.58 | 24.90 | 24.90 |
| | ST | 13.63 | 26.28 | 16.42 | 20.10 | 20.10 |
| | AN | 5.00 | 5.00 | 7.00 | 5.00 | 5.00 |
| Non-grafted copolymer | Content (parts by weight) | 40 | 40 | 40 | 40 | 40 |
| | Type | B-7 | B-8 | B-9 | B-4 | B-4 |
| | Refractive index | 1.5200 | 1.5454 | 1.5268 | 1.5315 | 1.5315 |
| | Weight-average molecular weight | 190,000 | 190,000 | 350,000 | 190,000 | 190,000 |

TABLE 2-continued

|  | Classification | | Comparative Examples 1 | Comparative Examples 2 | Comparative Examples 3 | Comparative Examples 4 | Comparative Examples 5 |
|---|---|---|---|---|---|---|---|
| Thermoplastic resin composition | Monomers (parts by weight) | MMA | 63.52 | 38.12 | 56.72 | 52.00 | 52.00 |
|  |  | ST | 27.48 | 52.88 | 34.28 | 39.00 | 39.00 |
|  |  | AN | 9.00 | 9.00 | 9.00 | 9.00 | 9.00 |
|  | MMA unit/ST unit | | about 2.31 | about 0.71 | about 1.64 | about 1.29 | about 1.29 |
|  | Weight-average molecular weight | | 160,000 | 160,000 | 270,000 | 170,000 | 165,000 |
|  | Melt flow index | | 2.2 | 3.5 | — | 3.0 | 2.4 |
|  | Haze value | | 2.0 | 5.1 | — | >50 | 1.7 |
|  | Impact strength | | 27 | 8 | — | 21 | 6 |
|  | Chemical resistance | | NG | OK | — | OK | OK |
|  | Gamma radiation discoloration | | 4.7 | 1.3 | — | 1.9 | 2.2 |

ST: styrene,
BD: 1,3-butadiene,
MMA: methyl methacrylate,
AN: acrylonitrile

TABLE 3

|  | Classification | | Comparative Examples 6 | Comparative Examples 7 | Comparative Examples 8 | Comparative Examples 9 |
|---|---|---|---|---|---|---|
| Graft copolymer powder | Content (parts by weight) | | 65 | 60 | 60 | 60 |
|  | Type | | A-11 | A-11 | A-12 | A-13 |
|  | Refractive index | | 1.5380 | 1.5380 | 1.5230 | 1.5160 |
|  | Weight-average molecular weight | | 80,000 | 80,000 | 130,000 | 100,000 |
|  | Rubber polymer | ST (wt %) | 30 | 30 | 10 | 0 |
|  |  | BD (wt %) | 70 | 70 | 90 | 100 |
|  |  | Average particle diameter | 350 | 350 | 300 | 300 |
|  |  | Refractive index | 1.5380 | 1.5380 | 1.5230 | 1.5160 |
|  | Rubber polymer and monomers (parts by weight) | Rubber polymer | 55.00 | 55.00 | 50.00 | 50.00 |
|  |  | MMA | 21.20 | 21.20 | 33.00 | 35.00 |
|  |  | ST | 20.80 | 20.80 | 16.00 | 12.00 |
|  |  | AN | 3.00 | 3.00 | 1.00 | 3.00 |
| Non-grafted copolymer | Content (parts by weight) | | 35 | 40 | 40 | 40 |
|  | Type | | B-10 | B-10 | B-11 | B-12 |
|  | Refractive index | | 1.5380 | 1.5380 | 1.5230 | 1.5160 |
|  | Weight-average molecular weight | | 90,000 | 90,000 | 190,000 | 150,000 |
|  | Monomers (parts by weight) | MMA | 44.10 | 44.10 | 63.50 | 70.40 |
|  |  | ST | 44.90 | 44.90 | 31.50 | 24.60 |
|  |  | AN | 11.00 | 11.00 | 5.00 | 5.00 |
| Thermoplastic resin composition | MMA unit/ST unit | | about 1.00 | about 1.00 | about 2.04 | about 2.88 |
|  | Weight-average molecular weight | | 85,000 | 85,000 | 170,000 | 130,000 |
|  | Melt flow index | | 11.4 | 13.1 | 3.0 | 2.7 |
|  | Haze value | | 2.3 | 2.3 | 2.9 | 2.1 |
|  | Impact strength | | 29 | 27 | 25 | 27 |
|  | Chemical resistance | | NG | NG | NG | NG |
|  | Gamma radiation discoloration | | 1.6 | 1.8 | 3.3 | 5.3 |

ST: styrene,
BD: 1,3-butadiene,
MMA: methyl methacrylate,
AN: acrylonitrile

60

Referring to Tables 1 to 3, in the case of Examples 1 to 6 which used styrene/butadiene rubber polymers prepared by polymerizing 10 to 35 wt % of styrene and 65 to 90 wt % of 1,3-butadiene, all of processability, transparency, impact resistance, chemical resistance, and gamma radiation resistance were excellent. However, in the case of Comparative Example 1 which used a styrene/butadiene rubber polymer prepared by polymerizing 6 wt % of styrene and 94 wt % of 1,3-butadiene, chemical resistance and gamma radiation resistance were substantially degraded compared to those of Examples 1 to 6.

In the case of Comparative Example 2 which used a styrene/butadiene rubber polymer prepared by polymerizing 40 wt % of styrene and 60 wt % of 1,3-butadiene, transparency and impact resistance were substantially degraded compared to those of Examples 1 to 6.

Meanwhile, in the case of Comparative Example 3 in which the weight-average molecular weight of a thermoplastic resin composition was 270,000 g/mol, molding was not performed during injection processing due to the excessively high weight-average molecular weight. Therefore, the evaluation of physical properties was not possible.

In the case of Comparative Example 4 which used a butadiene rubber polymer having an average particle diameter of 300 nm, transparency was substantially degraded.

In the case of Comparative Example 5 which used a styrene/butadiene rubber polymer having an average particle diameter of 100 nm, impact resistance was substantially degraded.

In the case of Comparative Examples 6 and 7 in which the weight-average molecular weight of a thermoplastic resin composition was 85,000 g/mol, chemical resistance was substantially degraded.

In the case of Comparative Example 8 in which the weight ratio of a (meth)acrylate-based monomer unit to a second styrene-based monomer unit was about 2.04, transparency, chemical resistance, and gamma radiation resistance were substantially degraded.

In the case of Comparative Example 9 in which the weight ratio of a (meth)acrylate-based monomer unit to a second styrene-based monomer unit was about 2.88, chemical resistance was degraded due to the excessively included methyl methacrylate unit, and manufacturing costs were increased due to the excessive use of methyl methacrylate which is an expensive raw material. Also, gamma radiation resistance was substantially degraded.

The invention claimed is:

1. A thermoplastic resin composition comprising:
a graft copolymer, and
a non-grafted copolymer,
wherein the graft copolymer includes:
    a rubber polymer having an average particle diameter of from 250 to 450 nm and including a first styrene-based monomer unit and a diene-based monomer unit in a weight ratio of 10:90 to 35:65,
    a (meth)acrylate-based monomer unit grafted onto the rubber polymer, and
    a second styrene-based monomer unit grafted onto the rubber polymer;

wherein the non-grafted copolymer includes:
    the (meth)acrylate-based monomer unit, and
    the second styrene-based monomer unit;
wherein a weight ratio of the (meth)acrylate-based monomer unit, which is all of the (meth)acrylate-based monomer units included in the thermoplastic resin composition, to the second styrene-based monomer unit, which is all of the second styrene-based monomer units included in the thermoplastic resin composition, is 2 or less; and
wherein the thermoplastic resin composition has a weight-average molecular weight of from 130,000 to 250,000 g/mol.

2. The thermoplastic resin composition of claim 1, wherein the weight ratio of the (meth)acrylate-based monomer unit to the second styrene-based monomer unit ranges from 0.80 to 2.00.

3. The thermoplastic resin composition of claim 1, wherein the thermoplastic resin composition has a weight-average molecular weight of from 140,000 to 210,000 g/mol.

4. The thermoplastic resin composition of claim 1, wherein the thermoplastic resin composition includes:
    the rubber polymer in an amount of from 20.00 to 40.00 wt %;
    the (meth)acrylate-based monomer unit in an amount of from 23.00 to 51.00 wt %; and
    the second styrene-based monomer unit in an amount of from 18.00 to 41.00 wt %.

5. The thermoplastic resin composition of claim 1, further comprising an acrylonitrile-based monomer unit.

6. The thermoplastic resin composition of claim 5, wherein the thermoplastic resin composition includes the acrylonitrile-based monomer unit in an amount of from 3.00 to 12.00 wt %.

7. The thermoplastic resin composition of claim 1, wherein the graft copolymer has a refractive index of from 1.5230 to 1.5420.

8. The thermoplastic resin composition of claim 1, wherein the graft copolymer has a weight-average molecular weight of from 70,000 to 250,000 g/mol.

9. The thermoplastic resin composition of claim 1, wherein the non-grafted copolymer has a weight-average molecular weight of from 140,000 to 250,000 g/mol.

10. The thermoplastic resin composition of claim 1, wherein the thermoplastic resin composition has a weight-average molecular weight of from 170,000 to 190,000 g/mol.

* * * * *